US007162944B2

(12) United States Patent
Britz

(10) Patent No.: US 7,162,944 B2
(45) Date of Patent: Jan. 16, 2007

(54) CONTINUOUS RECIPROCATING LINEAR MOTION DEVICE

(76) Inventor: Bret Allen Britz, 3009 W. Alison, Spokane, WA (US) 99208

( * ) Notice: Subject to any disclaimer, the term of this patent is extended or adjusted under 35 U.S.C. 154(b) by 0 days.

(21) Appl. No.: 10/907,878

(22) Filed: Apr. 19, 2005

(65) Prior Publication Data

US 2006/0230917 A1 Oct. 19, 2006

(51) Int. Cl.
*F01L 21/02* (2006.01)
*G01H 17/00* (2006.01)

(52) U.S. Cl. .......................... 91/227; 91/224; 91/222; 73/662

(58) Field of Classification Search .................. 91/222, 91/224, 225, 226, 227, 351, 354; 73/662
See application file for complete search history.

(56) References Cited

U.S. PATENT DOCUMENTS 1,848,844 A * 3/1932 Salmonson .................. 91/226
3,678,803 A * 7/1972 Schwenzfeier ................. 91/39
4,588,300 A * 5/1986 Guy ........................... 366/114
5,044,254 A * 9/1991 Miller et al. .................. 91/218
5,136,926 A * 8/1992 Bies et al. ..................... 91/226
5,209,564 A * 5/1993 Manci et al. ................. 91/234
6,044,709 A * 4/2000 Briggs et al. ................. 73/663

* cited by examiner

*Primary Examiner*—Thomas E. Lazo

(57) ABSTRACT

A linear fluid piston device not requiring a fluid valve to operate and has operating piston stroke capabilities beyond traditional vibration fluid devices. The linear fluid device features (a) a movable piston means for linear motion, (b) a feature wherein said body provides rotational movement for fluid port alignment and a pressure vessel containing an (c) end cap and (d) cavity sized to guide the movable piston. In the improvement, the moveable piston provides a method for changing the linear direction in the event the total linear piston movement has not completed.

12 Claims, 10 Drawing Sheets

TOP VIEW

DETAIL C

FRONT VIEW

RIGHT VIEW

FRONT VIEW SECTION D-D

FRONT VIEW SECTION E-E

TOP VIEW

AUXILIARY VIEW

TOP VIEW

SECTION F-F

CONTINUOUS RECIPROCATING LINEAR MOTION DEVICE

The following includes a utility patent application from Bret Allen Britz for an improved continuous reciprocating linear motion device.

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Ivention

This invention relates to a continuous reciprocating linear motion piston and cylinder device, using pressurized fluid to operate.

2. Background of the Invention

Linear motion devices utilizing pressurized fluid, includes a movable piston, a pressure vessel comprising of a cylinder (piston guide) and a end surface to retain pressure also described as a "cylinder head" or "end cap". The pressurized fluid fills the volume within the pressure vessel and one side of the piston causing the piston to move providing linear motion. The technology used for these devices are common knowledge in the hydraulic, pneumatic, and similar industries are usually generalized as a pneumatic or hydraulic "fluid cylinders" or simply "cylinders". These fluid cylinders are classified as 'single acting' meaning pressurized fluid is applied to one side of the piston and returned by a mechanical force such as a spring and exhausts the spent pressurized fluid and 'double acting' meaning pressurized fluid is applied alternately to both sides of the piston and spent fluid is alternately exhausted. To provide continuous reciprocating movement when a pressurized fluid is applied, most common fluid cylinder devices must make use of a fluid valve not associated directly with the fluid cylinder device in order to pressurize and exhaust the fluid. A primary disadvantage of this type of mechanism is the addition of the valve itself. The addition of a valve provides an additional arrangement of moving parts also adding to the possible failure of the system. Secondly, the valve fluid flow position is not directly linked to the position of the piston stroke and becomes a disadvantage when the piston movement cycle does not complete due to rapid cycling, low pressure inlet, blocked exhaust or other limitation and may cause non-functionality or inefficiency of the mechanism. Additional devices, mechanisms, or sensors may be incorporated into the final machine to allow a method for timing between the valve and the position of the piston cycle but also increases the number of parts in the system. In addition, the valve and sensors or other means, must also be operated by mechanical and/or electrical means placing greater inefficiency of the final system.

There are many patents using fluid cylinders, valves, sensors and mechanisms as previously described and the method of manufacture is well known. References to companies manufacturing these fluid devices include, Bimba, Speedaire and Jenco.

Alternate designs of a linear piston and cylinder device incorporates a fluid flow 'valve' into the piston by using directional flow channels for fluid input and exhaust and where the fluid inlet pressure exhaust ports are located directly on the cylinder wall. When a flow channel on the movable piston aligns with the fluid ports on the cylinder wall, a reciprocating linear movement of the piston is the result. This type of fluid cylinder is generally used as a vibration device and has the benefit of being self contained, meaning; a valve and/or other external devices is not required for the basic function of the moveable piston. As long as adequate pressure is applied to the fluid input on the cylinder wall, the piston will automatically begin to cycle.

The primary disadvantage of this technology are the fixed fluid inlet and exhaust ports which limits the fluid energy applied to the piston due to only a brief alignment with the corresponding flow channels of the piston. Therefore, the piston movement must rely on momentum of the briefly pressurized fluid inlet, also known as the power stroke, while compressing the remaining trapped exhaust gasses ultimately causing inefficiency of the mechanism. The inability to control the piston position under variable loads limits the device to be ineffective when used in conjunction with as output shaft to drive an external device or mechanism.

A reference of a vibrator invention is disclosed in U.S. Pat. No. 6,044,709 (Briggs) whereas it is claimed that the invention provides a method for easier mounting and manufacturability than existing vibratory devices. There are also reference patents for this mechanism and use of the mechanism as disclosed by references made by Briggs, however, the functional fundamentals of the fluid device are essentially the same. Manufacturers of pneumatic vibrators include Cleveland Vibrator Co., Cleveland, Ohio, and Martin Engineering Co., Neponset, Ill.

OBJECTS AND ADVANTAGES

Accordingly, besides the objects and advantages of the linear device as described in my above statements, several objects and advantages of the present invention are as described as follows:

- Does not require a separate fluid valve to reciprocate.
- Operates similarly to a linear fluid device in conjunction with a fluid valve whereas:
- It provides a means to power most or all of the stroke of the linear device during pressurized fluid input
- It provides a means to exhaust most or all of the exhaust fluid
- Offers better flexibility than the linear fluid device in conjunction with an additional fluid valve whereas:
- It does not require a fluid valve
- It does not require electricity or other energy input beyond the working fluid pressure to operate
- It does not require additional devices such as sensors to synchronize the inlet and exhaust porting to the linear position
- Operates similarly to a linear fluid device not requiring an external fluid valve to operate in a reciprocating motion whereas:
- It also incorporates an integrated 'valve' into the movable piston
- It requires the piston as the only moving part of the fundamental device It operates in a reciprocating linear motion when adequate pressurized fluid is applied to the device.

Offers better flexibility than the linear fluid device not requiring an external fluid valve to operate in a reciprocating motion whereas:

It provides a means for a power stroke beyond the simple alignment between the input port and the pressurized fluid inlet on the piston It provides a means for better exhausting of spent fluid It can be used with an output shaft(s) to operate another device or mechanism under external fixed or variable loading.

Like the current technology, the disclosed device is simple, easy to manufacture, and is highly reliable.

Further objects and advantages will disclose a linear device which can function beyond the current technology of linear piston cylinder devices of all types. In addition, the alternate embodiments explain additional mechanisms based on the same principles as disclosed in the preferred embodiment with different capabilities depending on the design intent.

SUMMARY

In accordance with the present invention, a reciprocating linear device comprises of a moveable piston device, a cylinder to retain pressure and guide the piston device, and an end cap or ‘head’ located at the end of the cylinder to retain pressure within the cylinder. The function of the disclosed device does not require an additional fluid valve to operate or require additional sensors or mechanisms for piston stroke location. It provides extended power and exhaust strokes beyond current fluid vibrator linear technology by providing a mechanism which shifts the piston in a rotational motion to align the inlet and exhaust ports while at the same time restricts porting in the opposing linear movement.

DRAWINGS—FIGURES

Figure 9:
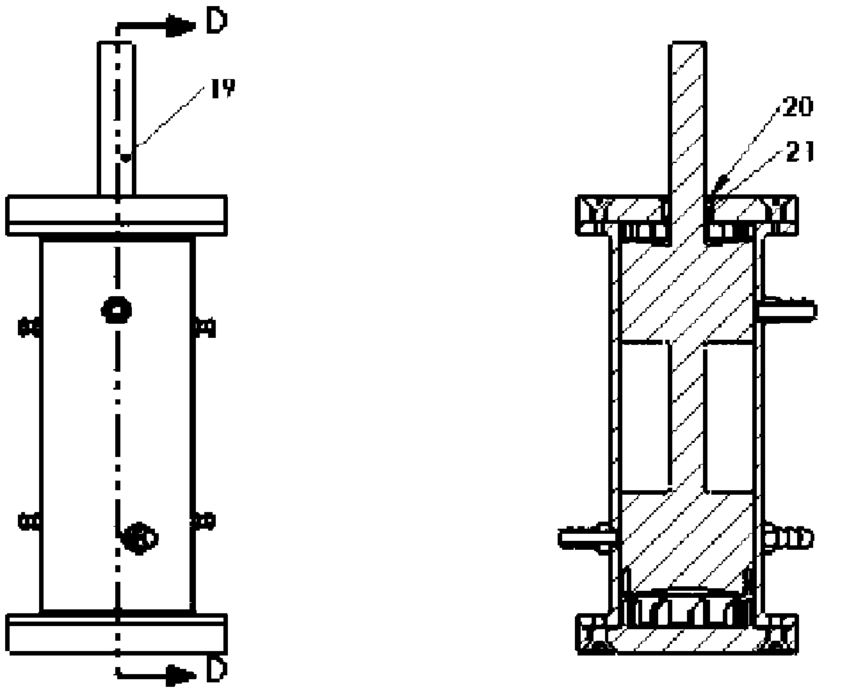
Figure 10:
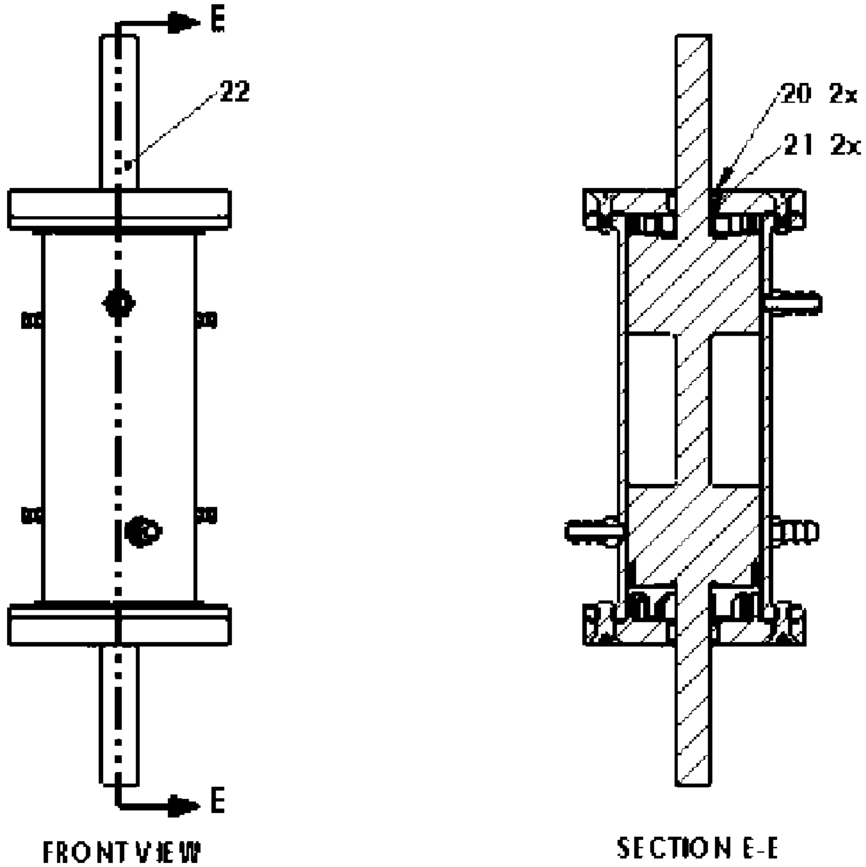
Figure 11:
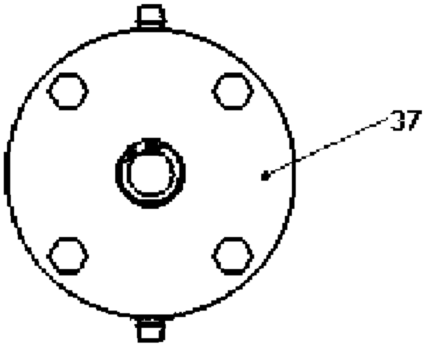
Figure 11:
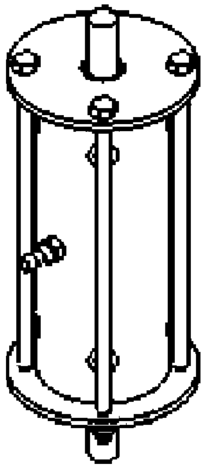
Figure 11:
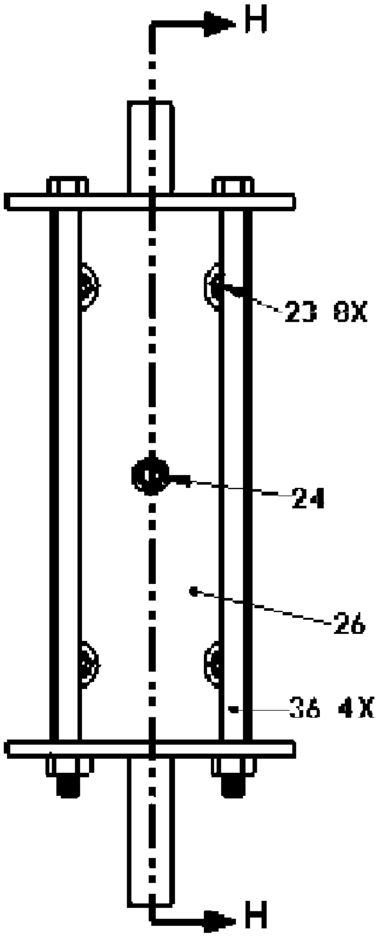
Figure 11:
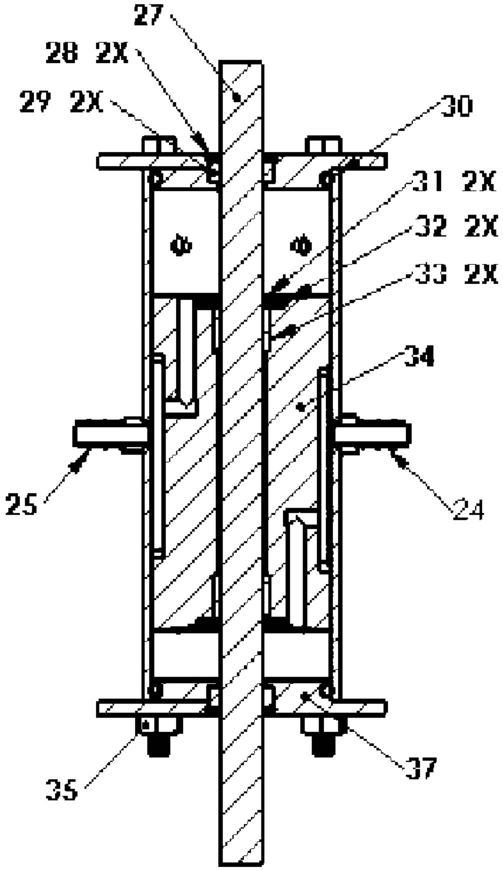
Figure 12:
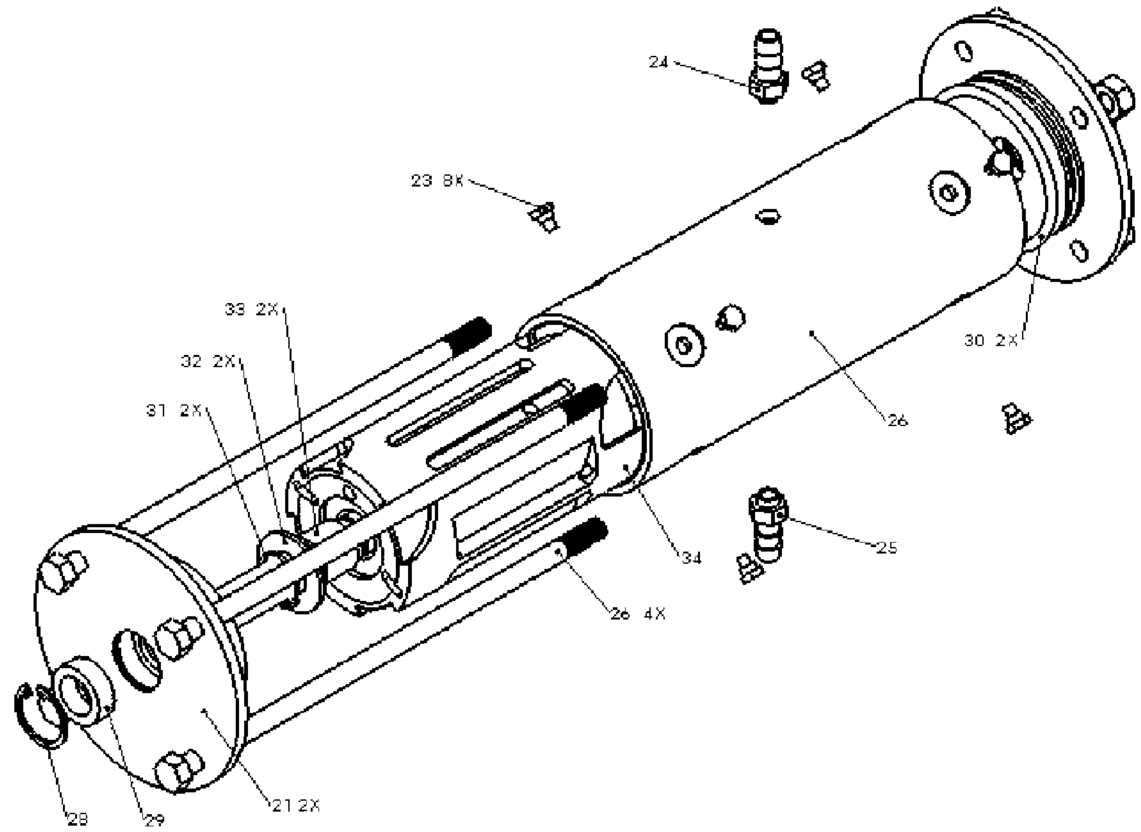
Figure 13:
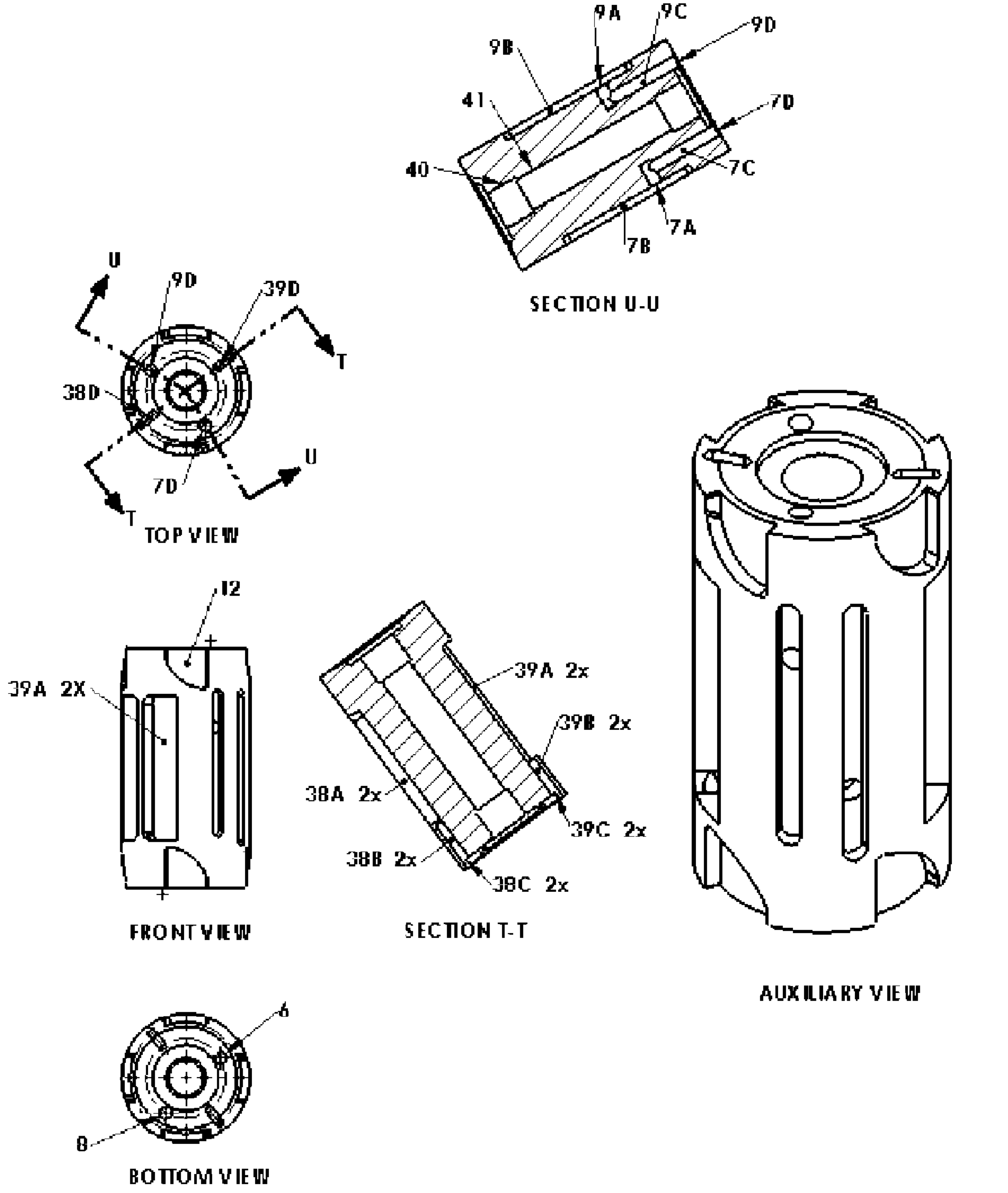
Figure 14:
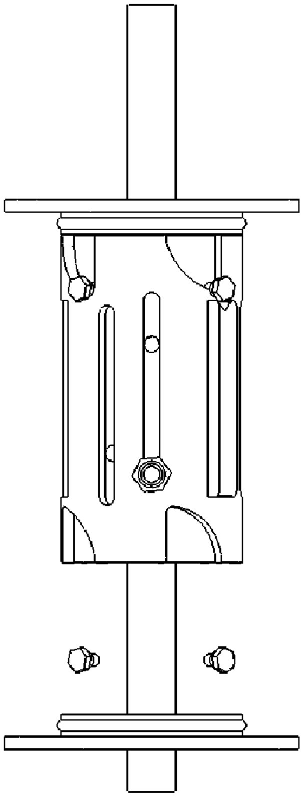

FIG. 9 shows a alternate embodiment of the linear piston device as a single acting device with a mechanical spring return FIG. 10 shows a linear piston device with a double shaft output FIG. 11 shows an alternate embodiment of the linear piston device FIG. 12 shows details of the alternate embodiment piston FIG. 13 shows an exploded view of an alternate embodiment FIG. 14 shows the alternate embodiment in position 1

Figure 15:
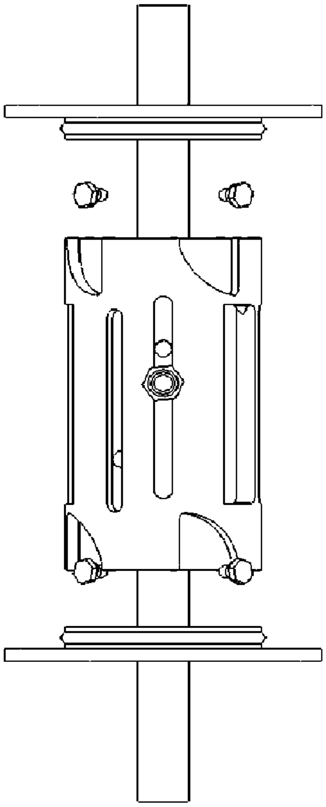

FIG. 15 shows the alternate embodiment in position 2

Figure 16:
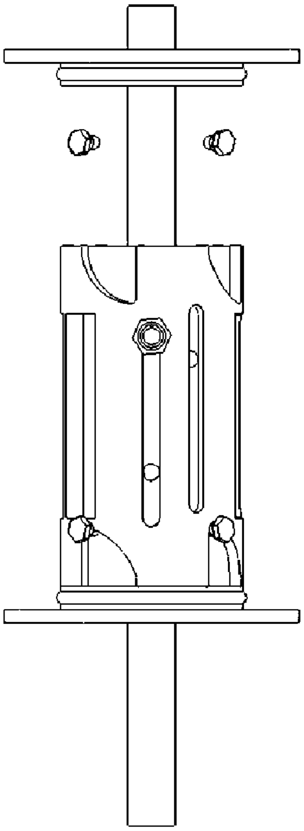

FIG. 16 shows the alternate embodiment in position 3

Figure 17:
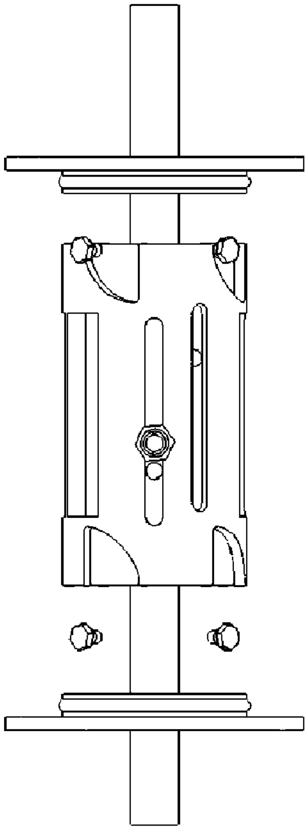

FIG. 17 shows the alternate embodiment in position 4

DRAWINGS—REFERENCE NUMERALS

1 Cylinder
2 Piston
3 Cylinder head
4A Pressurized fluid inlet port 1
4B Pressurized fluid inlet port 2
4C Exhaust port 1
4D Exhaust port 2
5 Piston alignment guides
6 Piston relief
7 Head gasket
8 Cap head bolt
9A Piston pressurized fluid inlet 1
9B Piston pressurized fluid inlet flow channel 1
9C Piston pressurized fluid inlet vane 1
9D Piston pressurized fluid inlet outlet 1
10A Piston pressurized fluid inlet 2
10B Piston pressurized fluid inlet flow channel 2
10C Piston pressurized fluid inlet vane 2
10D Piston pressurized fluid inlet outlet 2
11A Piston exhaust fluid outlet 1
11B Piston exhaust fluid flow channel 1
11C Piston exhaust fluid vane 1
11D Piston exhaust fluid inlet 1
12A Piston exhaust fluid outlet 2
12B Piston exhaust fluid flow channel 2
12C Piston exhaust fluid vane 2
12D Piston exhaust fluid inlet 2
13A Piston rotational alignment interface 1
13B Piston rotational alignment interface 1
14 Piston fluid flow recess 1
15A Piston guide channel 1
15B Piston guide channel 1
16 Gasket location
17 Cylinder head to cylinder mechanical alignment and mount
18 Cylinder head rotational alignment interface
19 Piston with single shaft
20 Internal snap ring
21 Bushing shaft
22 Piston with double shaft
23 Piston guide alternate
24 Pressurized Inlet fluid port
25 Exhaust port
26 Cylinder alternate
27 Piston shaft
28 Internal snap ring
29 Bushing piston
30 O-ring cylinder head
31 External snap ring
32 Washer piston
33 Bushing cylinder head
34 Piston alternate
35 Nut
36 Bolt
37 Cylinder head alternate
38A Pressure alignment guide 1
38B Pressure alignment flow channel 1
38C Pressure alignment outlet 1
38D Pressure alignment relief 1
39A Exhaust alignment guide 1
39B Exhaust alignment flow channel 1
39C Exhaust alignment outlet 1
39D Exhaust alignment relief 1
40 Shaft clearance
41 Bushing location

DETAILED DESCRIPTION—EMBODIMENT

Figure 1:
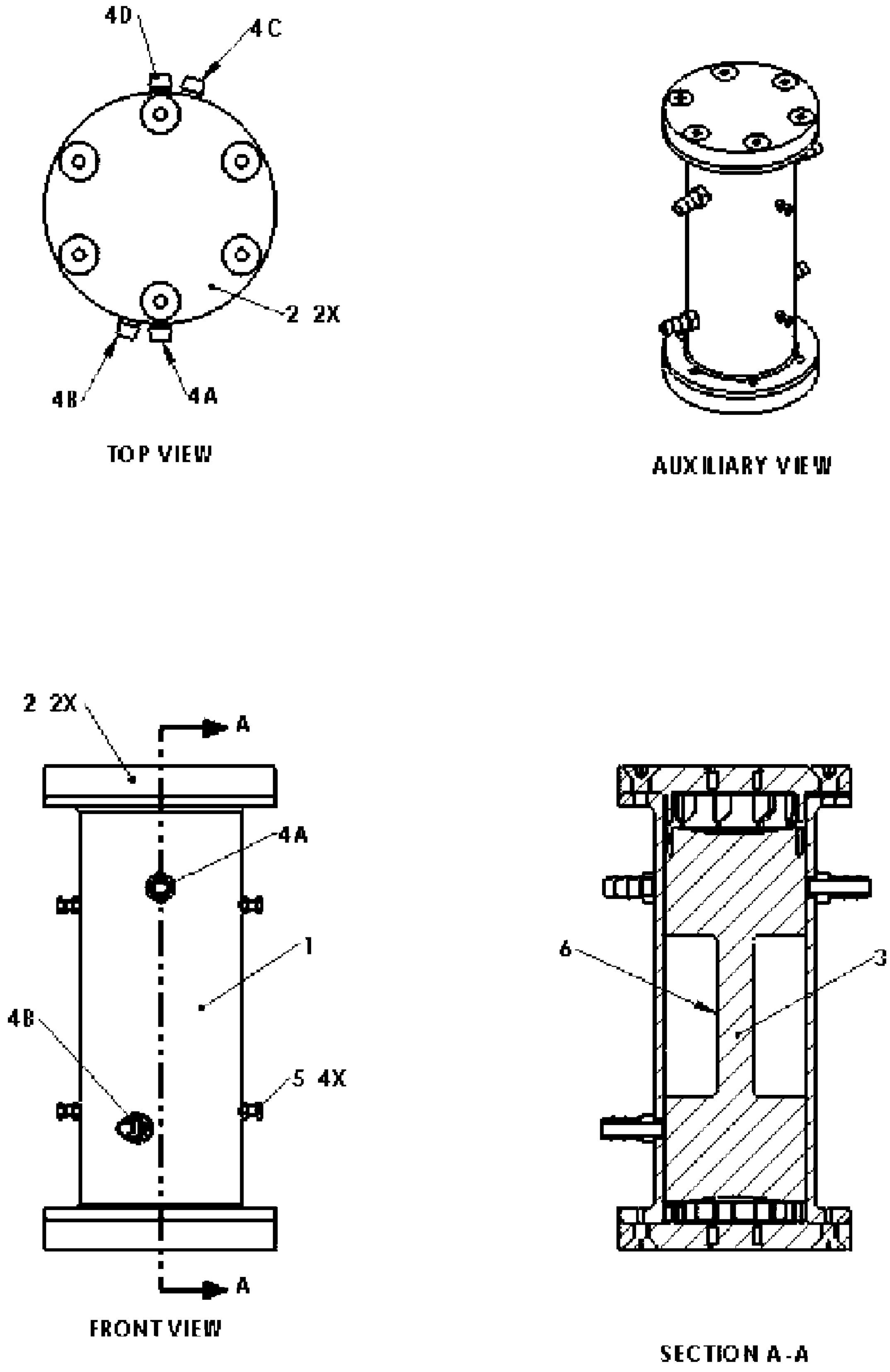
FIG. 1 shows the assembled linear piston device in a top, front, right, and isometric views and section A—A.

An embodiment of the mechanism of the present invention is illustrated in FIG. 1. The disclosed mechanism shows a double acting fluid arrangement meaning that pressurized fluid is alternately applied to each end of the piston as the piston reciprocates. The parts making up the device are the cylinder 1, the cylinder heads 2, the piston 3 the inlet ports 4A and 4B the exhaust ports 4C and 4D and the piston guides 5. The cylinder provides a guide for the piston for movement in a linear motion. The cylinder 1 also allows pressurized fluid input and exhaust. Per the disclosed design, the cylinder provides means of attachment to the cylinder heads 2 and piston guides 5. The inlet 4A and 4B and exhaust ports 4C and 4D are connected to the cylinder wall by mechanical attachment. The ports allow fluid flow through the cylinder wall as necessary to generate reciprocating piston movement. The piston guides 5 are also connected to the cylinder wall by mechanical attachment. The guides are used for locating the piston in the necessary configuration during the reciprocating movement. To allow for proper weight displacement of the piston or to provide a means for an internal mechanism attached to the piston, a piston relief 6 is shown.

Figure 2:
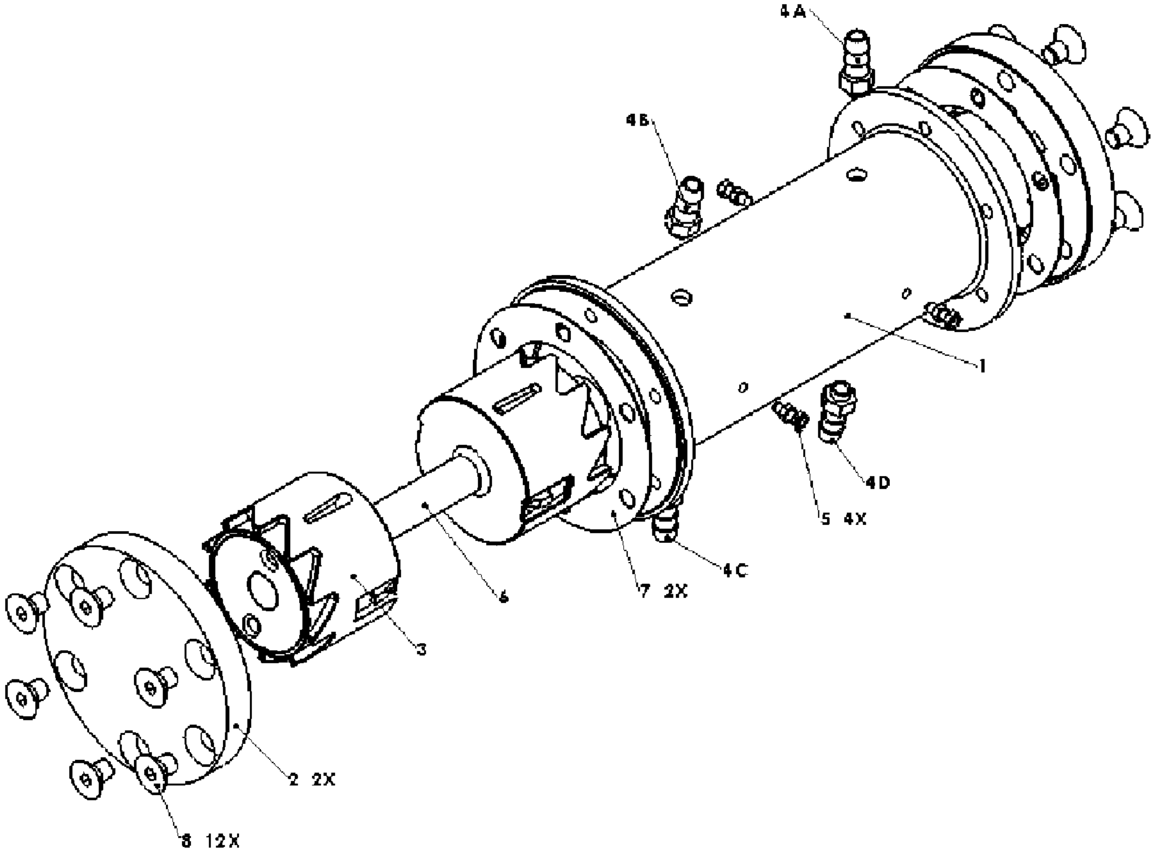
FIG. 2 shows an exploded view of the invention
Figure 3:
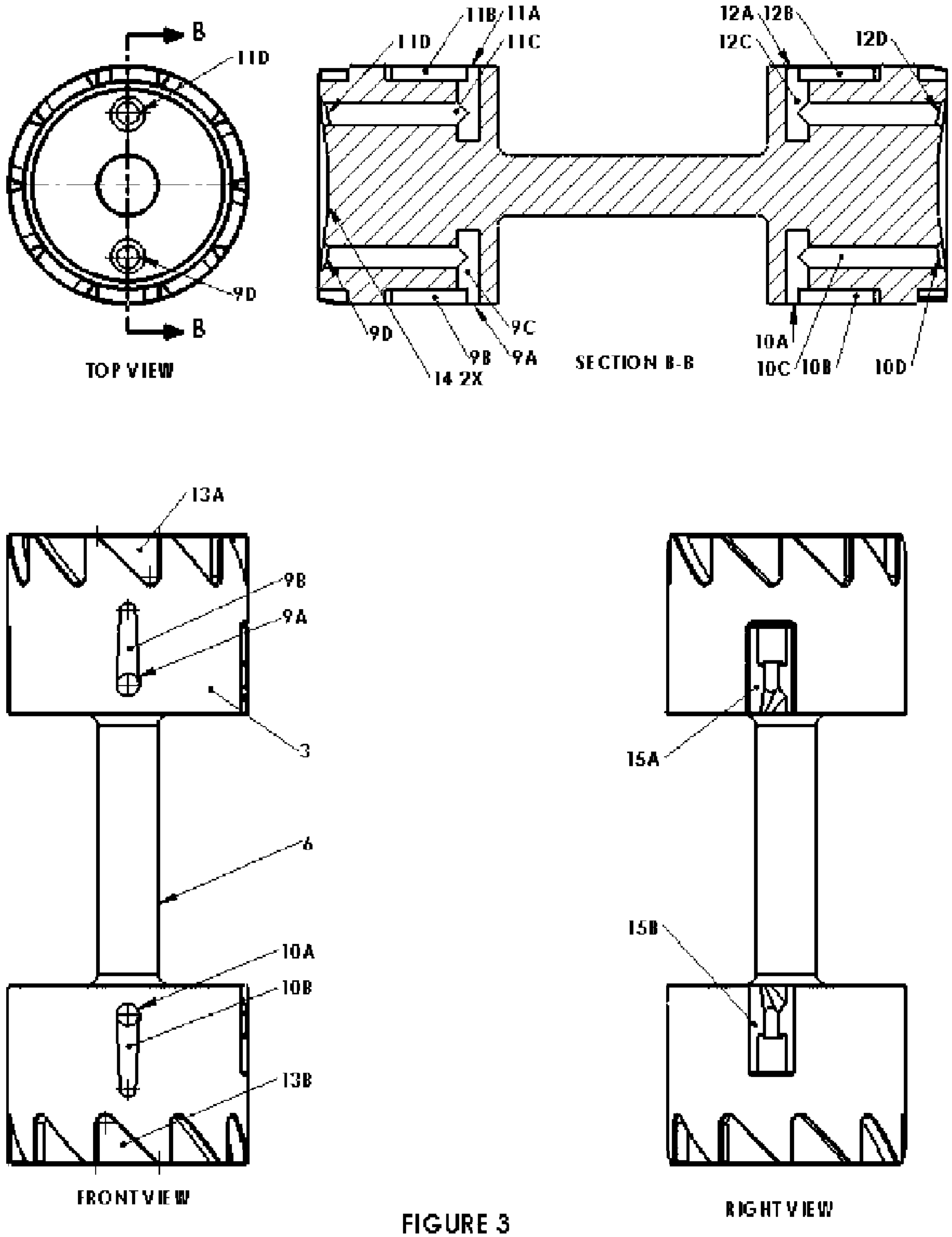
FIG. 3 shows the piston in greater detail in with a top, front, and right views and section B—B.

The piston 3 converts the pressurized fluid energy into linear reciprocating movement. The piston is guided by the cylinder 1 for linear movement and will have a maximum stroke length as provided by the cylinder, piston length, and cylinder heads 2. The piston has several unique features. FIG. 2 shows an exploded view of the assembly and provides the ability to view the head gasket 7 to prevent pressure and exhaust leaks between the cylinder and head and the fasteners 8 used to attach the heads to the cylinder. FIG. 3 shows the design of the piston in greater detail. The primary features include the pressurized fluid inlet flow features 9A, 9B, 9C, and 9D and alternately 10A, 10B, 10C, and 10D. These features channel the pressurized fluid to the piston end to allow piston movement. The exhaust fluid flow features, 11A, 11B, 11C, and 11D and alternately 12A, 12B, 12C, and 12D allows movement of the exhaust fluids from the piston end and channels it to the cylinder wall. An interface feature located on the piston 13A and 13B between the cylinder heads 2 and the piston are shown. These features provide proper orientation of the piston during the reciprocating movement by allowing the fluid flow ports to have proper alignment by rotating the piston to the appropriate port locations. Piston guide channels 15A and 15B allow the interface with the piston guides 5 located on the cylinder. These channels retain the proper positioning of the piston during the reciprocating movement. Lastly, a recess 14 is shown to assist fluid pressure for increased surface area at the end of the piston.

Figure 4:
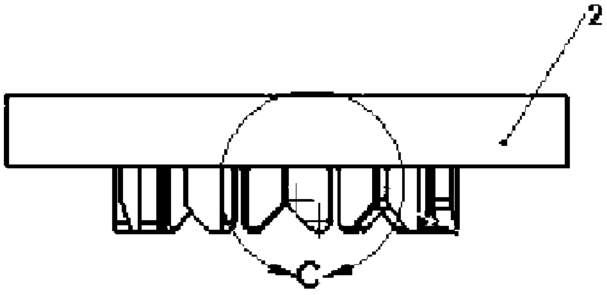
FIG. 4 shows the piston head in greater detail with a top, front, and right views and detail C.
Figure 4:
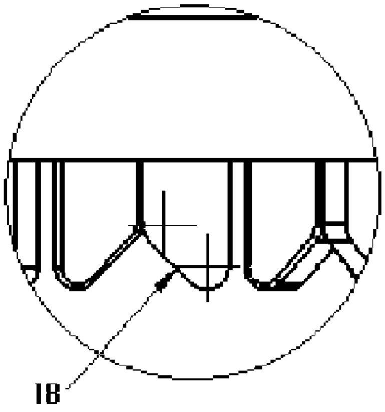
Figure 4:
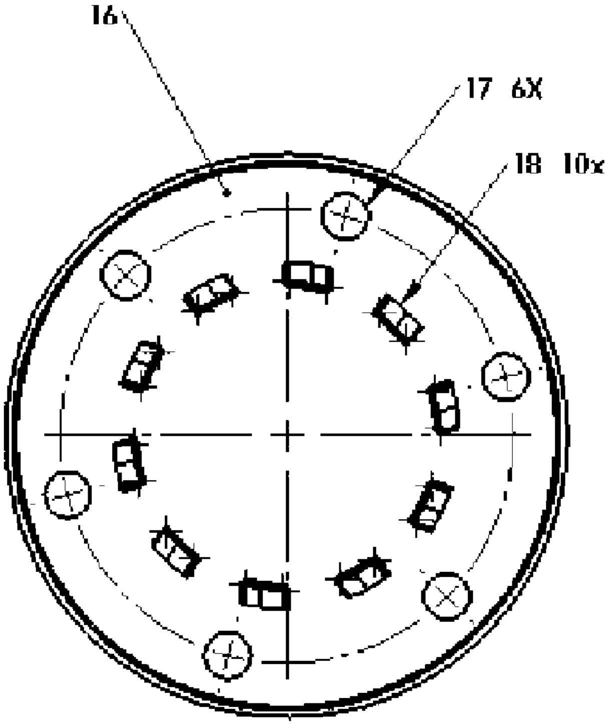
Figure 4:
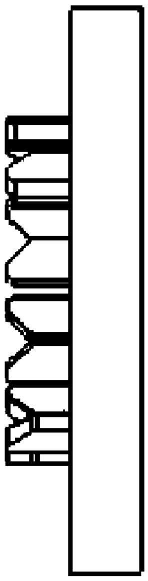

FIG. 4 shows the cylinder head 2 in greater detail. The cylinder heads are used to cap each end of the cylinder to retain fluid pressure and are attached to the cylinder 1 by mechanical means. The cylinder head also has unique design features shown in 18 to locate the piston appropriately for pressurized fluid input and exhaust. These features are shown larger in Detail C whereas the feature interfaces with an opposing feature on the piston providing proper alignment. A mounting location is also shown in 17 to connect the cylinder head to the cylinder and provides proper alignment between the piston and the cylinder heads. This alignment also locates the piston appropriately within the device. To prevent pressure and exhaust leaks a gasket location is provided 16.

OPERATION—PREFERRED EMBODIMENT

Figure 5:
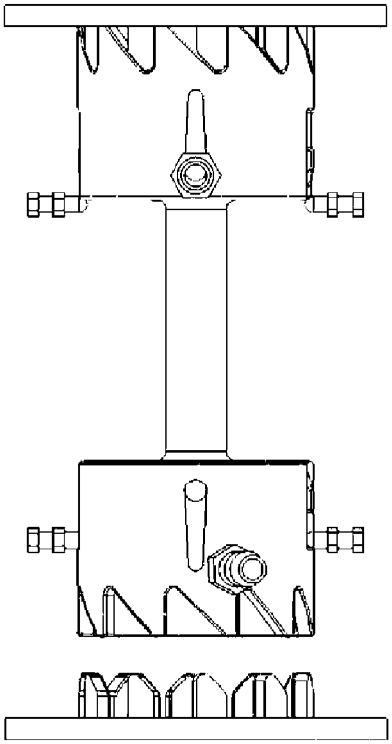
FIG. 5 shows an embodiment operation position 1

FIGS. 5, 6, 7, and 8 shows the invention with the cylinder 2 hidden and additionally describes the operation of the device. In FIG. 5, the piston is its first phase where it has achieved maximum stoke in one direction and the pressurized fluid inlet 4A has aligned with the piston fluid channel 9B. The fluid travels through the piston pressurized fluid inlet port 9A and through the flow vein 9C to the piston pressurized fluid outlet 9D and pushes the piston in the opposite direction. As the piston moves the piston pressurized flow channel 9C continues to provide pressurized fluid through the flow members 9A, 9B, and 9D. In addition, the exhaust port 4C is aligned with the piston exhaust channel 12C to allow exhaust fluids to escape from the opposite side of the piston. As with the inlet port, the exhaust fluids travel through the piston exhaust inlet 12D and travel though the piston exhaust fluid vane 12C to the piston exhaust fluid outlet 12A and escape the cylinder wall by aligning the piston exhaust fluid channel 12B to the exhaust port 4C on the cylinder wall. During this movement, the piston alignment guides 5 keep the piston from rotational movement.

Figure 6:
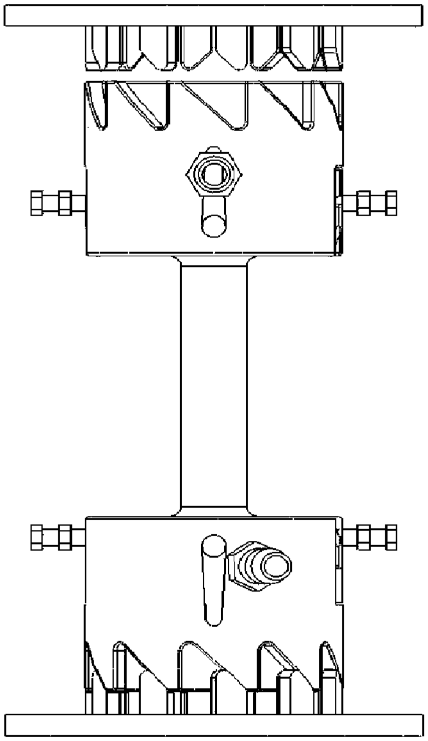
FIG. 6 shows an embodiment operation position 2

FIG. 6 shows the piston reaching the end of its stroke and intersects the cylinder head alignment features 18. At this stage the piston guides 13B allow rotational movement of the piston 3. During the remainder of the piston stroke, the piston alignment rotational interface on the cylinder head 18 continue to interact with the piston rotational interface 13B to rotate the piston to begin to shut off pressurized inlet flow to 4A and exhaust flow to the exhaust port 9C. At the same time, the piston begins to align the piston pressurized inlet flow channel 10B to the pressurized inlet port 4B and the piston fluid exhaust channel 11B begins to align with the exhaust port 4D.

FIG. 6 shows the completion of the linear movement and also completes rotation of the piston and aligns the corresponding inlet and exhaust channels with their associated ports while shutting off the fluid flow to the alternate ports as explained in the previous paragraph. The piston reverses direction and the piston guides 5 are reengaged during this opposite linear movement to prevent piston rotation.

Figure 7:
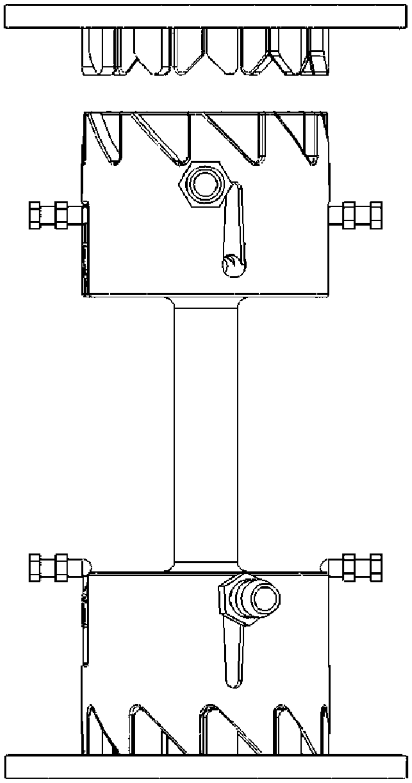
FIG. 7 shows an embodiment operation position 3
Figure 8:
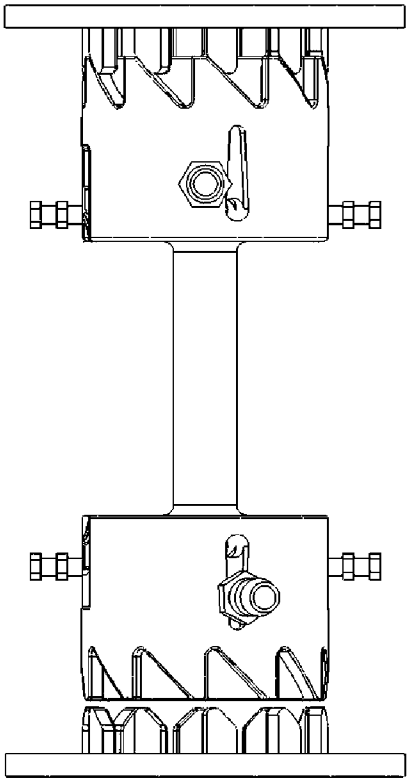
FIG. 8 shows an embodiment operation position 4

FIG. 7 is the last stage of the reciprocating movement. At this stage the piston guides 18 allow rotational movement of the piston 3 through the piston rotational interface 13A. During the remainder of the piston stroke, the piston alignment rotational interface 18 on the cylinder head continue to interact with the piston rotational interface 13A to rotate the piston and begin to shut off pressurized inlet flow to 4B and exhaust flow to the exhaust port 9D. While at the same time, the piston begins to align the piston pressurized inlet flow channel 9A to the pressurized inlet port 9A and the piston fluid exhaust channel 12B begins to align with the exhaust port 4D.

DESCRIPTION—FIGS. 8, 9, AND 10—ADDITIONAL EMBODIMENTS

FIG. 9 shows a single shaft 19 connected to the piston and protrudes beyond the cylinder head 2, a double shaft option shown in FIG. 10, 17 can also be used as per the design intent. These external shaft options provides a means to apply the energy of the piston movement to an external device requiring reciprocating movements such as required for pumping and linear electrical generation. Whereas, the proper stoke length is obtained by the length relationship of the piston to the cylinder and correspond, the “valve” function is dependant on the piston length and fluid porting relationship. Fluid pressure is retained within the cylinder by a busing 20 and the busing is held in place by the head 2 and an internal retaining ring.

The length and position relationships provide the required control over the distance traveled per the design intent while at the same time, does not require the piston to contact the piston head as used as an impact or vibration device without shaft output.

The current invention also allows for single stroke or double stroke capabilities. All descriptions of the invention until now have been double stroke mechanisms, meaning, that the pressurized inlet fluid as alternately applied to each end of the piston and each side of the piston must also alternately exhaust the exhaust fluids.

Single stroke function works similarly to the double stoke function with the exception that the pressurized inlet fluids are only applied to one end of the piston. The return stroke must then be returned by a mechanical mechanism or device such as a spring or working fluid.

FIG. 11 shows an alternate method of the linear movement. The functional end results are the same. The primary difference in comparison to the preferred embodiment as described above is a) an alternate method to provide rotational movement to the piston by placing the rotational interface incorporated with the cylinder rather than the head. b) The fluid inlet and exhaust ports use only 2 positions rather than 4. c) A means piston rotation is provided to allow rotation using fluid pressures in the event of variable loads causing a linear stall. d) Alternate assembly methods throughout the assembly.

A cylinder 26 is used in this assembly and retains the inlet fluid port 24 and exhaust fluid port 25 and also the piston rotational guides 23. A piston 34 is similar to the preferred embodiment in the method used to provide linear movement. The piston stroke within the cylinder is longer than the preferred embodiment to demonstrate an alternate method of use. A shaft is connected to the piston using an external snap ring 31 and a washer 32 and is allowed to rotate independently of the piston using a bushing 33. The shaft protrudes beyond the cylinder head 37 and pressurized and exhaust fluid is not allowed to escape by the use of a busing 29 and the bushing is retained between the cylinder head and an internal snap ring 28. In addition, pressurized fluid is retained between the cylinder head and cylinder using an o-ring 30. This mechanism is assembled using bolts 36 and nuts 35. FIG. 12 shows an exploded view of the embodiment.

ALTERNATE EMBODIMENTS

For the linear fluid piston device(s) as described above, several alternate methods of design and manufacture are possible while contributing to the same functionality of as described in the above disclosure.

For example, the method described to rotate the piston with the head for valve alignment should not be limited to any of the specific designs disclosed within this document. The number of interface positions, angles and shapes, and location can all differ. It is also reasonable to assume that these and other features be arranged elsewhere and may use a different method as described.

It is also reasonable to assume there are several methods to keep the piston aligned with the ports on the cylinder during its linear motion. This disclosure discusses piston guides to be mounted into the cylinder wall and protrude into features on the piston. The opposite may be true as well where features on the piston may intersect with the cylinder or features associated elsewhere may provide guidance or even the shape or nature of the combination of parts eliminate guides of any kind altogether.

This disclosure is intended to not be limited to the specific design as disclosed rather this discloser discusses the function of the device under many various possibilities based on the design intent.

CONCLUSION, RAMIFICATIONS, AND SCOPE

Accordingly the reader will see that the linear fluid device of this invention will provide many uses where few moving and sensory parts are desired with improved function over existing technology. Furthermore the linear fluid device has the following additional advantages where:

- The invention does not require a separate fluid valve to reciprocate.
- Operates similarly to a linear fluid device in conjunction with a fluid valve by providing a means to power most or all of the stroke of the movable piston.
- Offers better flexibility than the linear fluid device not requiring an external fluid valve to operate in a reciprocating motion since it does not require electricity or other energy input beyond the working fluid pressure to operate and does not require additional devices such as sensors to synchronize the valve setting to the linear position
- Operates similarly to a linear fluid device not requiring an external fluid valve to operate in a reciprocating motion by relying only on the piston as its only moving part and can operate in a reciprocating linear motion while pressurized input fluid is applied to the device.
- Offers better flexibility than the linear fluid device not requiring an external fluid valve to operate in a reciprocating motion by providing a means for a power stroke beyond the simple alignment between the input port and the pressurized fluid inlet on the piston and provides a means for a greater exhaust stroke beyond the simple alignment between the exhaust port and the exhaust fluid outlet on the piston and can be used with an output shaft(s) to operate another device or mechanism under external load.
- Like the current technology, the disclosed device is a simple mechanism, easy to manufacture, and is highly reliable.

Although the description above contains many specificities, these should not be construed as limitations on the scope of the invention but as exemplifications of the presently preferred embodiments thereof. Many other ramifications and variations are possible within the teachings of the invention. For example, many different materials, shapes, size, method of manufacturability, method of assembly, feature count and spacing, and effective piston stroke may be modified per the design intent. Since the invention uses pressurized fluid, the fluid can be obtained through a number of methods including compressed air, external energy heat transfer, steam, internal combustion gasses, fluids in the liquid phase, and solid materials simulating fluid flow.

Thus the scope of the invention should be determined by the appended claims and their legal equivalents, and not strictly by the examples given.

What is claimed is:

1. A pressurized fluid linear motion device comprising (a) a movable piston means for linear motion, (b) a body that provides rotational movement for fluid port alignment, and (c) a pressure vessel containing an end surface to retain pressure and a cavity sized to guide the movable piston, wherein said movable piston means further provides said rotational movement.

2. The pressurized fluid linear motion device in claim 1, wherein the moveable piston means includes an angled feature for rotation by interaction of a fixed feature.

3. The pressurized fluid linear motion device in claim 1, wherein the moveable piston means includes a variable sloping feature for rotation by interaction of a fixed feature.

4. The pressurized fluid linear motion device in claim 1, wherein the moveable piston means includes a feature for rotation by interaction with a fixed feature on said end surface.

5. The pressurized fluid linear motion device in claim 1, wherein the moveable piston means includes a feature for rotation by interaction with a fixed feature on said cavity.

6. The pressurized fluid linear motion device in claim 1, wherein the moveable piston means include alignment of inlet fluid flow, alignment of exhaust fluid flow, restriction to opposing inlet fluid flow, and restriction to opposing exhaust fluid flow means for linear movement of said moveable piston.

7. The pressurized fluid linear motion device in claim 1, wherein the moveable piston means includes a recess for means of generating a pressure difference for rotational alignment of ports.

8. The pressurized fluid linear motion device in claim 1, wherein the moveable piston means includes a recess for means of generating a pressure difference for rotational alignment of ports.

9. The pressurized fluid linear motion device in claim 1, wherein the cavity includes a fixed feature means for providing said rotational movement.

10. The pressurized fluid linear motion device in claim 1, wherein the cavity includes a fixed feature means for preventing said rotational movement.

11. The pressurized fluid linear motion device in claim 1, wherein the end surface includes a fixed feature means for providing said rotational movement.

12. The pressurized fluid linear motion device in claim 1, wherein the end surface includes a fixed feature means for preventing said rotational movement.

* * * * *